US008094557B2

(12) United States Patent
Messing et al.

(10) Patent No.: US 8,094,557 B2
(45) Date of Patent: Jan. 10, 2012

(54) ADAPTIVE FAST RETRANSMIT THRESHOLD TO MAKE TCP ROBUST TO NON-CONGESTION EVENTS

(75) Inventors: Jeffrey P. Messing, Round Rock, TX (US); Elizabeth J. Murray, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/169,816

(22) Filed: Jul. 9, 2008

(65) Prior Publication Data

US 2010/0008223 A1 Jan. 14, 2010

(51) Int. Cl.
*H04L 12/56* (2006.01)
(52) U.S. Cl. ......... 370/231; 370/235; 370/252; 370/465
(58) Field of Classification Search .................. 370/231, 370/235
See application file for complete search history.

(56) References Cited

U.S. PATENT DOCUMENTS

| | | | | |
|---|---|---|---|---|
| 6,438,101 B1* | 8/2002 | Kalampoukas et al. | ...... | 370/229 |
| 6,611,495 B1* | 8/2003 | Meyer et al. | ................ | 370/230.1 |
| 6,958,997 B1* | 10/2005 | Bolton | ........................... | 370/392 |
| 6,975,591 B1* | 12/2005 | Shorey et al. | ................. | 370/229 |
| 2002/0054570 A1* | 5/2002 | Takeda | ......................... | 370/252 |
| 2002/0085587 A1* | 7/2002 | Mascolo | ....................... | 370/477 |
| 2002/0150048 A1* | 10/2002 | Ha et al. | ...................... | 370/231 |
| 2005/0036511 A1* | 2/2005 | Baratakke et al. | ........... | 370/469 |
| 2007/0223492 A1* | 9/2007 | Lee et al. | ................. | 370/395.52 |
| 2008/0291911 A1* | 11/2008 | Lee et al. | ..................... | 370/389 |
| 2009/0316579 A1* | 12/2009 | Tang | ............................. | 370/231 |

OTHER PUBLICATIONS

S. Bhandarkar et al., Improving the Robustness of TCP to Non-Congestion Events, Aug. 2006, USA (http://www.icir.org/mallman/papers/rfc4653.txt).
Ludwig, Reiner and Katz, Randy H., The Eifel Algorithm: Making TCP Robust Against Spurious Retransmissions, 2003, USA (http://iceberg.cs.berkeley.edu/papers/...).
Blanton, Ethan and Allman, Mark, On Making TCP More Robust to Packet Reordering. ACM Computer Communication Review, 32(1), Jan. 2002, USA.
Casetti, C. et al., Load Balancing Over Multipaths Using Bandwidth-Aware Source Scheduling, 2004, Italy (http://primo.ismb.it/firb/docs/primo.pdf).
Caro, Armando, L., et al., Using SCTP Multihoming for Fault Tolerance and Load Balancing, 2002, USA (http://www.armandocaro.net/publications/2002.sigcomm.posterAbstract.pdf).
Caro, Armando, L., et al., Using SCTP Multihoming for Fault Tolerance and Load Balancing, 2002, USA (http://www.armandocaro.net/publications/2002.sigcomm.poster.pdf).

* cited by examiner

*Primary Examiner* — Ricky Ngo
*Assistant Examiner* — Rasheed Gidado
(74) *Attorney, Agent, or Firm* — Stephen J. Walder, Jr.; Jill A. Poimboeuf

(57) ABSTRACT

Mechanisms are disclosed for adjusting a fast re-transmit threshold (FRT) value for transmitting data streams over a computer system. One embodiment includes receiving, by a sender, a current fast re-transmit threshold value for a packet from a receiver. Further, these mechanisms include decreasing the size of the congestion window of the sender, and re-transmitting the packet to the receiver in network communication with the sender. Further still, the mechanisms include counting, by the sender, a number of dupacks after re-transmitting the packet until arrival, at the sender, of an acknowledgement (ACK) for the packet. Yet further, the mechanisms include determining, based on the size of the congestion window and the counting, a value of the FRT value. If the sender receives the ACK for the packet in less than one round trip time, then this may be a re-ordering problem for re-setting the FRT value.

20 Claims, 4 Drawing Sheets

| THE FIVE-LAYER TCP/IP MODEL |
|---|
| 1. APPLICATION LAYER |
| DHCP · DNS · FTP · Gopher · HTTP · IMAP4 · IRC · NNTP · XMPP · POP3 · RTP · SIP · SMTP · SNMP · SSH · TELNET · RPC · RTCP · RTSP · TLS (and SSL) · SDP · SOAP · GTP · STUN · NTP · etc. |
| 2. TRANSPORT LAYER |
| TCP · UDP · DCCP · SCTP · RSVP · ECN · etc. |
| 3. NETWORK/INTERNET LAYER |
| IP (IPv4 · IPv6) · OSPF · IS-IS · BGP · IPsec · ARP · RARP · RIP · ICMP · ICMPv6 · IGMP · etc. |
| 4. DATA LINK LAYER |
| 802.11 (WLAN) · 802.16 · Wi-Fi · WiMAX · ATM · DTM · Token ring · Ethernet · FDDI · Frame Relay · GPRS · EVDO · HSPA · HDLC · PPP · PPTP · L2TP · ISDN · ARCnet · LLTD · etc. |
| 5. PHYSICAL LAYER |
| Ethernet physical layer · Modems · PLC · SONET/SDH · G.709 · Optical fiber · Coaxial cable · Twisted pair · etc. |

FIG. 2

ADAPTIVE FAST RETRANSMIT THRESHOLD TO MAKE TCP ROBUST TO NON-CONGESTION EVENTS

BACKGROUND

The present disclosure generally relates to methods, systems and media for making Transmission Control Protocol (TCP) robust to packet re-ordering. More specifically, the present disclosure uses one or more computer systems that adapt the fast retransmit threshold (FRT) to make TCP robust to non-congestion events by adjusting the current or initial FRT value, which may be a hard-coded 3, upon FRT's value being relative to the size of the congestion window.

Transmission Control Protocol (TCP) generally provides reliable, in-order delivery of a stream of bytes, i.e., data, which makes it suitable for applications like file transfer and e-mail. TCP, then, is the transport protocol that manages the individual "conversations" between web servers and web clients. As previously stated otherwise, TCP divides the HTTP messages into smaller pieces, called segments, to be sent to the destination client. It is also responsible for controlling the size and rate at which messages are exchanged between the server and the client.

For ordering of segments/packets, TCP uses a "sequence number" to identify each byte of data. The sequence number identifies the order of the bytes sent from each computer so that the data can be transferred reliably and in order, regardless of any fragmentation, disordering, or packet loss that occurs during transmission. For every byte transmitted the sequence number must be incremented. In the first two steps of a 3-way handshaking, both computers exchange an initial sequence number (ISN). This number can be arbitrary, and should in fact be unpredictable, in order to avoid a TCP sequence prediction attack.

TCP primarily uses a cumulative acknowledgment scheme, where the receiver sends an acknowledgment (ACK) signifying that the receiver has received all data preceding the acknowledged sequence number. Essentially, the first data byte in a segment is assigned a sequence number, which is inserted in the sequence number field, and the receiver sends an ACK specifying the sequence number of the next byte they expect to receive. For example, if computer A sends 4 bytes with a sequence number of 100 (conceptually, the four bytes would have a sequence number of 100, 101, 102, & 103 assigned), then the receiver would send back an ACK of 104 since that is the next byte it expects to receive in the next packet. By sending an ACK of 104, the receiver is signaling that it received bytes 100, 101, 102, & 103 correctly. If, by some chance, the last two bytes were corrupted then an ACK value of 102 would be sent since 100 & 101 were received successfully. If the sender infers that data has been lost in the network, it retransmits the data.

TCP uses a number of mechanisms to achieve high performance aimed at congestion control and avoidance of congestion collapse, where network performance can fall by several orders of magnitude. These mechanisms control the rate of data entering the network, keeping the data flow below a rate that would trigger collapse. Acknowledgments (ACKs) for data sent, or lack of ACKs, are used by senders to infer network conditions between the TCP sender and receiver. Coupled with timers, TCP senders and receivers can alter the behavior of the flow of data. This is more generally referred to as congestion control and/or network congestion avoidance.

Modern implementations of TCP contain four intertwined algorithms: slow-start, congestion avoidance, fast retransmit, and fast recovery. In addition, senders employ a retransmission timer that is based on the estimated round-trip time (RTT) between the sender and receiver, as well as the variance in this round trip time. There are subtleties in the estimation of RTT. For example, senders must be careful when calculating RTT samples for retransmitted packets; typically they use Karn's Algorithm or TCP timestamps. These individual RTT samples are then averaged over time to create a Smoothed Round Trip Time (SRTT) using Jacobson's algorithm. This SRTT value is what is finally used as the round-trip time estimate.

Turning to fast retransmit (FR), this is an enhancement to TCP which reduces the time a sender waits before retransmitting a lost segment. A TCP sender uses timers to recognize lost segments. If an acknowledgement is not received for a particular segment within a specified time (a function of the estimated round-trip delay time), the sender will assume the segment was lost in the network, and will retransmit the segment. The fast retransmit enhancement works as follows: if a TCP sender receives three duplicate acknowledgements (dupacks) with the same acknowledge number (that is, a total of four acknowledgements with the same acknowledgement number), the sender can be reasonably confident that the segment with the next higher sequence number was dropped, and will not arrive out of order. The sender will then retransmit the packet that was presumed dropped before waiting for its timeout. As previously suggested, the fast retransmit threshold (FRT) is a hard-coded 3, i.e., 3 dupacks or dupackthresh, and involves use of a backtracking algorithm.

SUMMARY

Embodiments of the present disclosure generally provide methods, systems, and media for adjusting a fast re-transmit threshold (FRT) value for transmitting streams of data over a computer system. One embodiment includes receiving, by a sender, a current fast re-transmit threshold value for a packet from a receiver. Further, the method includes decreasing a size of a congestion window of the sender, and re-transmitting the packet to the receiver, which is in network communication with the sender on the computer system. Further still, the method includes counting, by the sender, a number of dupacks after re-transmitting the packet until arrival, at the sender, of an acknowledgement (ACK) for the packet. Yet further, the method includes determining, based on the size of the congestion window and the counting, a value of the FRT value. If the sender receives the ACK for the packet in less than one round trip time, then this is indicative of a re-ordering problem for re-setting the FRT value.

In another embodiment, the present disclosure provides a system for adjusting a fast re-transmit threshold (FRT) value for transmitting streams of data over a computer system. The system includes a sender on the computer system for receiving a current fast re-transmit threshold value for a packet from a receiver over the networked computer system to the sender. Further, the system includes a congestion module associated with the sender for decreasing a size of a congestion window. Further still, the system includes a transmission module associated with the sender for re-transmitting the packet to the receiver. Yet further, the system includes a counter associated with the sender for counting, subsequent to execution of the transmission module, a number of dupacks until arrival, at the sender, of an ACK for the packet. Finally, the system includes a determination module for determining, based on a size of the congestion window and the number of dupacks received by the sender, a value of the fast re-transmit threshold value.

In yet another embodiment, the present disclosure provides a machine-accessible storage medium containing instructions for adjusting a fast re-transmit threshold (FRT) value for transmitting streams of data over a computer system, whereby when the instructions are executed by a machine, they cause the machine to perform operations. The instructions generally include operations receiving, by a sender, a current fast re-transmit threshold value for a packet from a receiver. The instructions further include operations for decreasing a size of a congestion window of the sender, and re-transmitting the packet to the receiver, which is in network communication with the sender on the computer system. Further still, the instructions include operations for counting, by the sender, a number of dupacks after re-transmitting the packet until arrival, at the sender, of an acknowledgement (ACK) for the packet. Yet further, the instructions include operations for determining, based on the size of the congestion window and the counting, a value of the FRT value. If the sender receives the ACK for the packet in less than one round trip time on the particular computer system, i.e., coupling between the particular sender and the particular receiver, then this is a indicative of a re-ordering problem for re-setting the FRT value.

BRIEF DESCRIPTION OF THE SEVERAL VIEWS OF THE DRAWING

So that the manner in which the above recited features, advantages and objects of the present disclosure are attained and can be understood in detail, a more particular description of the present disclosure, briefly summarized above, may be had by reference to the embodiments thereof which are illustrated in the appended drawings.

It is to be noted, however, that the appended drawings illustrate only typical embodiments of this present disclosure and are therefore not to be considered limiting of its scope, for the present disclosure may admit to other equally effective embodiments.

FIG. 2 depicts a general hierarchy of the five TCP/IP layers that may be used in the network couplings between the sender and the receiver for the protocol communications for use in adjusting a fast re-transmit threshold value for transmitting streams of data over the networked computer system in accordance with the present disclosure.

DETAILED DESCRIPTION

The following is a detailed description of example embodiments of the present disclosure depicted in the accompanying drawings. The embodiments are examples and are in such detail as to clearly communicate the present disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The detailed descriptions below are designed to make such embodiments obvious to a person of ordinary skill in the art.

Generally speaking, methods, systems, and media for use in adjusting a fast re-transmit threshold value for transmitting streams of data over the networked computer system are contemplated. Embodiments include receiving by a sender in network communication with at least one receiver, wherein the foregoing is collectively referred to as a "computer system", the current fast re-transmit threshold (FRT) value of dupacks, i.e. duplicate acknowledgement, which has the same acknowledgment number as its predecessor and signifies that the TCP receiver has received a segment newer than the one it was expecting, i.e. it has missed a segment. Upon receipt of the current FRT value, which may be a hard-coded FRT value of three dupacks in the ordinary state of the art, the sender's congestion window is recorded and then halved before re-transmitting, by the sender, the packet to the receiver. Having recorded the round trip time (RTT) for the particular sender and receiver over the particular network connection, the sender continues to count the number of dupacks for the re-transmitted packet to the receiver until the sender receives an acknowledgement (ACK). Based on the size of the congestion window and the number of dupacks counted until arrival of the ACK, a value of the FRT can be determined, estimated, and re-set if the data suggests such. That is, if the RTT is less than one for the ACK received by the sender, then the re-transmitted packet's ACK was indicative of a re-ordering problem, and re-setting the FRT in accordance therewith is advised in order to tune the FRT to what it should be. However, if the RTT is at or near one for the ACK received by the sender, then the re-transmitted packet's ACK was indicative of data loss, e.g., the packet was lost, and, accordingly, re-setting the FRT is unnecessary. Accordingly, the FRT value may adapt to actual network conditions relative to the size of the congestion window, such as knowing when to increase and decrease the FRT value, but all the while conservation of packets is preserved in line with TCP principles.

Figure 1:
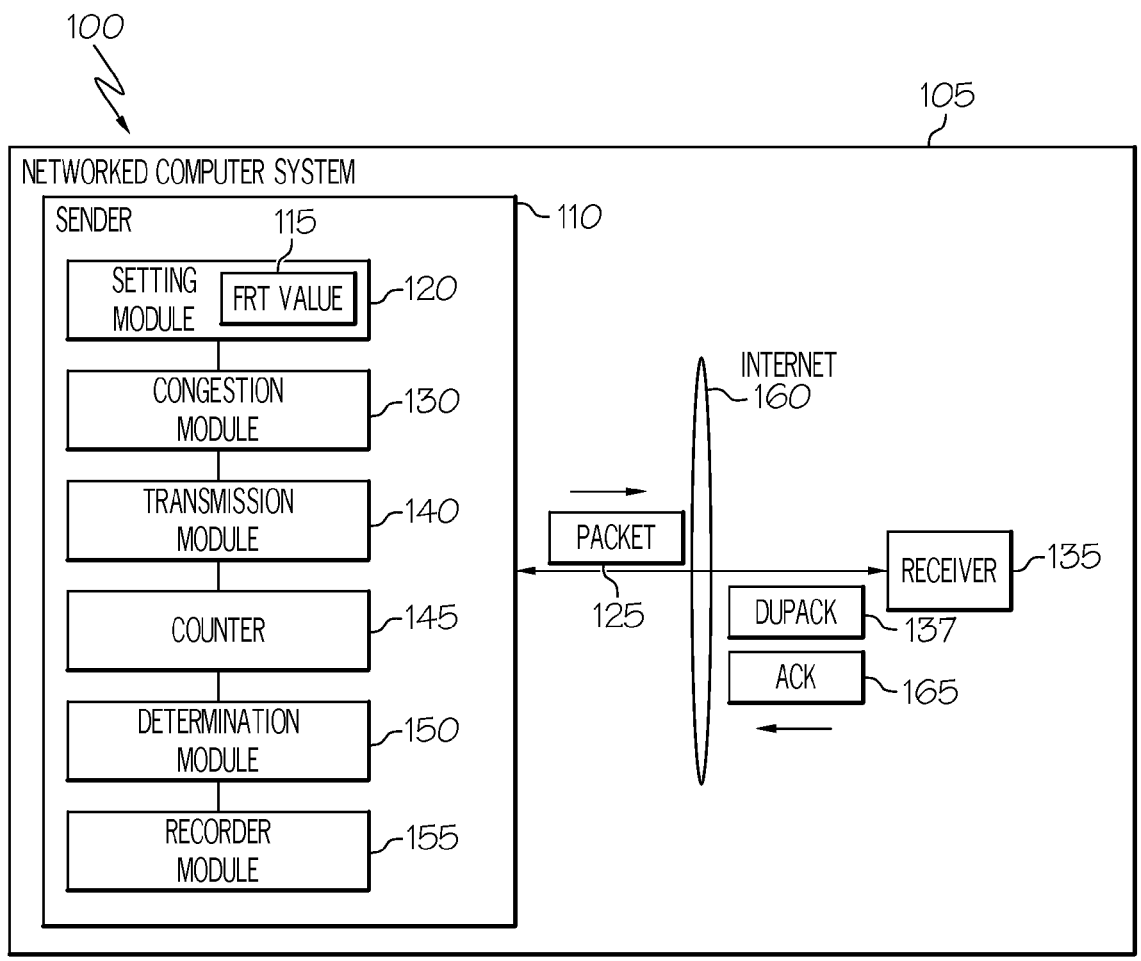
FIG. 1 depicts an example embodiment of a system for a sender to receive dupacks, halve the congestion window, re-transmit a packet, record the congestion window and round trip time of a packet, count dupacks until receiving an ACK for the packet, and determine if and what a new FRT value should be based on the congestion window and the counting in accordance with the present disclosure.

Turning now to the drawings, FIG. 1 depicts an embodiment of a system 100 for adjusting a fast re-transmit threshold (FRT) value 115 for transmitting streams of data in packets over a networked computer system 105. The system 100 includes a networked computer system 105 including, for example, computers, PDAs, or cell phones as the sender 110 or receiver 135, in integral or networked communication 160 with each other. For example, the networked computer system 105 transmits the stream of data in packets, e.g., 125, over an internet 160 coupling the sender 110 to the receiver 135. Data transmitted over the network computer system 105 involves the sender 110 sending packets of data, where data packet 125 is illustrative of part of this stream of data, and this stream of data packets is received in various orders, rarely in the perfect order, by the receiver 135, which sends back an acknowledgement (ACK) 165 for each packet 125 received in the proper order. If the receiver 135 receives a packet 125 it was not expecting to receive next in the stream of packets comprising the data being sent over the exemplary internet 160 coupling between the sender 110 and receiver 135, then the receiver 135 will send the sender 110 a dupack 137, that is, a duplicate packet, over the internet 160 to the sender 110.

This tells the sender 110 that the receiver 135 did not receive the next duplicate packet 137 the receiver 135 was expecting to receive for the stream of data transmitted across the internet 160 coupling the sender 110 to the receiver 135, and, therefore, there was either data packet loss due to poor connectivity or limited resources, collectively referred to as a congestion problem, or there is a re-ordering problem, a non-congestion event. The latter may be due to the next proper packet not having arrived at the receiver 135 because, for example, that next packet has a longer travel time to the receiver 135 because a different path is being used to reach the receiver 135 as compared to another packet that is next or later in the line of the stream of data for compiling at the receiver 135 because that next or later packet used still another, but shorter or faster, route to the receiver 135. In this instance, the sender 110 will receive a dupack 137 from the receiver 135, which, effectively says to the sender that the receiver 135 has not yet received what the receiver 135 is expecting next. So, the sender 110 can wait until it 110 receives three dupacks from the receiver 135, which is standard value in the art indicated by a variable known as the fast retransmit threshold (FRT) 115.

Before further discussion, a quick retreat is instructive at showing the communication means occurring over the exemplary internet 160 coupling the sender 110 and the receiver 135 of the networked computer system 105 shown in FIG. 1. This retreat from FIG. 1 requires reference to FIG. 2 for a brief discussion of the communication means over the internet 130. Table 200 shows a five-layer an internet protocol suite or Transmission Control Protocol/Internet Protocol (TCP/IP) model, which is the set of communications protocols that implement the protocol stack on which the internet and most commercial networks run, where TCP and IP were also the first two networking protocols defined. Today's IP networking represents a synthesis of Local Area Networks (LANs). The internet protocol suite like many protocol suites can be viewed as a set of layers as shown in Table 200 and for use in the present disclosure. Each of the five layers depicted in FIG. 2 solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP reference model, itself, consists of the four layers shown in FIG. 2. Most commercial operating systems include and install the TCP/IP stack by default. For most users, there is no need to look for implementations. TCP/IP is included in commercial Unix systems, Mac OS X, and all free-software Unix-like systems such as Linux distributions and BSD systems, as well as Microsoft Windows. Similarly, in the present disclosure, knowing when and how to adjust the FRT value relative to the congestion window is also implemented within the TCP/IP protocol stack found in the operating system being used.

Having just discussed and shown the communication means for and used by the networked computer system 105 in the transfer of streams of data over an exemplary internet 160 shown in FIG. 1, further discussion of FIG. 1 now ensues. The sender 110 includes a setting module 120, enabled by logic reduced to hardware and/or software, such as by a software application associated with the sender 110 for executing the setting-related instructions. The setting module 120 allows for setting and re-setting the FRT value 115. Under ordinary conditions in the art, the FRT value 115 is a hard-coded 3, but the present disclosure allows for adjusting the initial, current, or any FRT value 115 if conditions exist that warrant changing the FRT value 115. In order to determine when and how to change the FRT value 115, further logic, also reduced to hardware and/or software, found in a congestion module 130 halves the size of the sender's 110 congestion window, which is the maximum amount of data that the sender 110 can transmit at once. Before decreasing, such as by halving, a size of the sender's 110 congestion window, additional logic, reduced to hardware and/or software and found in the sender's 110 recorder module 155, records the initial value of the congestion window before decreasing the congestion window. And, still additional logic enables the recorder module 155 to calculate the round trip time (RTT) for a packet 125 to be sent from the sender 110 to the receiver 135 and back to the sender 110. Knowing the RTT for a particular sender 110 and particular receiver 135 over a particular coupling 160 for a networked computer system 105 allows the user to know how much time should theoretically pass before the sender 110 can expect to receive an ACK 165 for a transmitted packet 125 for the particular networked computer system 105. Having now recorded both the initial congestion window size and RTT, the system 100 includes further enabling logic reduced to hardware and/or software in the transmission module 140 to re-transmit the packet 125 from the sender 110 to the receiver 135. Re-transmission is the normal behavior when the sender 110 receives the current FRT value of dupacks, such as a dupack 137 for a previously transmitted packet 125, but in the present case, the congestion module 130 halves the sender's 110 congestion window to begin testing and determining whether and how to adjust the current FRT value 115 from its initial value, which may or may not be the hard-coded three commonplace in the existing art, based on actual network conditions for the networked computer system 105. The reason, for instance, that the current FRT value 115 may not be three is that one or more previous executions of the logic disclosed herein may have resulted in resetting the current FRT value to a value other than three.

When the transmission module 140 re-transmits the packet 125 after the system's 100 congestion module 130 halves the congestion window and the recorder module 155 records both the original congestion window size and the RTT, a counter 145, enabled by hardware and/or software logic, continues to keep count of the number of dupacks, such as dupack 137 received by the sender 110 before an ACK 165 arrives for the packet 125. Further logic, reduced to hardware and/or software, found in the system's 100 determination module 150 determines, based on the size of the new size of the congestion window and the total number of dupacks, e.g., 150, received by the sender 110 before receiving an ACK 165 for the packet 125, the FRT value 115. By working in tandem with the setting module 120, the determination module 155 may or may not reset the current FRT value 115. The determination module 155 may estimate and re-set the FRT value 115 if the sender 110 receives the ACK 165 for the packet 125 in less than one RTT, which is indicative of a re-ordering, i.e., non-congestion, problem. However, if the sender 110 receives the ACK 165 for the packet 125 near or greater than one RTT, then the determination module 155 working in tandem with the setting module 120 may retain the FRT value 115 because this is a data loss problem remediable by simple re-transmission and not a re-ordering problem. The determination module's 150 enabling estimating logic, reduced to hardware and/or software, may re-set the current FRT value 115 by an array of mathematical models, e.g., setting the initial, current, and/or new FRT value 115 to the total number of "X" dupacks received by the sender 110, creating an average for the FRT value 115, increasing the FRT value 115 by one until the correct FRT value is achieved, etc. In estimating a new and/or proper FRT value 115, it is noteworthy that X depends very much on the congestion window, and there will not be many dupacks if many packets are not being sent. So, the FRT value 115 is determined by the relative value of X to the congestion window; if the congestion window changes, then the FRT value 115 will change automatically. Again, if the congestion window changes size, then the FRT value 115 will also change size because the FRT value 115 will be relative to the size of the congestion window. In the event of a retransmission timeout, then the value of X is halved. So, in event of certain packet loss, the size of FRT decreases exponentially. The idea is to try to determine the right proportion by dynamically adjusting the FRT value 115 relative to the congestion window.

To give an example of how this would work, suppose the sender 110 receives three dupacks. Assuming there was data loss, the congestion window is halved, and then a packet is fast re-transmitted. But, rather than simply moving on, count is kept of the number of dupacks until a packet that advances the sending window, i.e., an ACK, whereby the size of the congestion window is recorded before the congestion window is halved. If such an "advancing ACK" is received before one RTT expires, which means that the receiver 135 is not ACKing the retransmitted packet, and supposing that X dupacks arrive at the sender 110 before this point, then we can estimate, for example, that X dupacks did not indicate packet loss, i.e., instead, there is a re-ordering problem on the networked computer system 105.

One area where the present disclosure would find application is transport layer load balancing. An example reason for considering FRT relative to the congestion window makes sense because, in reality, multiple packets sent from multiple senders, such as 110, is expected, and heavier re-ordering is expected when more packets are sent. To make this more clear, imagine a scenario where data is sent out over two paths, and one path is half as fast as the other. Suppose 10 packets are sent from source A and source B, and source B is half as fast as source A. The packets from source A will all arrive before the packets from source B, and so, 9 dupacks will be sent before an ACK that advances the congestion window. If 20 packets were sent, then the number of dupacks would be 20, etc.

Figure 3:
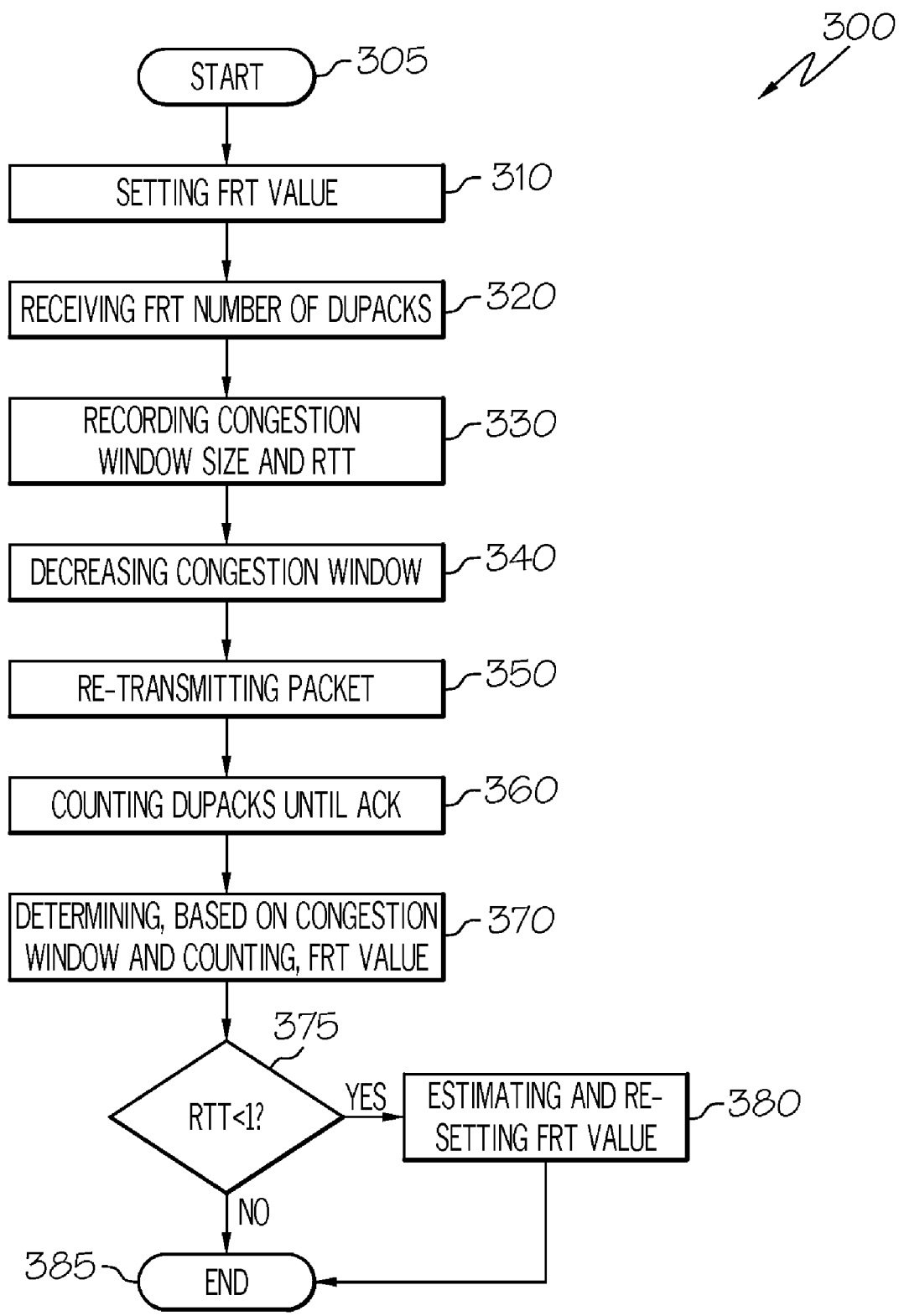
FIG. 3 depicts an example embodiment of a method for a sender to receive dupacks, halve the congestion window, re-transmit a packet, record the congestion window and round trip time of a packet, count dupacks until receiving an ACK for the packet, and determine if and what a new FRT value should be based on the congestion window and the counting in accordance with the present disclosure.

Turning now to FIG. 3, another aspect of the present disclosure is disclosed. In particular, an embodiment of a flowchart 300 for adjusting a fast re-transmit threshold value for transmitting streams of data over the networked computer system is depicted. Flowchart 300 is for a system, such as system 100, as shown in FIG. 1.

Flowchart 300 starts 305 by a user, administrator, operator, or application developer setting 310, as well as re-setting the established value at the END 375 if warranted, the FRT value by selecting, through enabling logic, reduced to hardware and/or software, the FRT value through textual entry and/or through prompts, drop-down menus, radio button, check boxes, and so forth to set the preferences. The flowchart 300 then includes receiving 320, by the sender after sending a packet, the current FRT value of dupacks, which may be three or another value, wherein three dupacks is based on the established FRT value ordinarily known in the art. By further enabling logic found in a software application and/or reduced to hardware, the flowchart 300 continues by recording 330 both the initial size of the sender's congestion window and the RTT for the particular network computer system involving a sender and receiver in network communication with each other via, for instance, an internet connection, wherein the RTT may be calculated for a packet by pinging. After recording both of the foregoing size and value, the flowchart 300 continues by decreasing 340, such as by a third, a size of the sender's congestion window and re-transmitting 350 the packet to the receiver, which occurs through executed instructions for performing these operations by logic reduced to software and/or hardware.

Rather than just re-transmitting 350 packets time and time again into the dark, however, the flowchart 300 shows the illustrative exemplary method for the present disclosure counting 360 the dupacks by enabling logic that continue to accrue at the sender received from the receiver until an ACK arrives at the sender. Moving on, the flowchart 300 determines 370, based on the congestion window and the counted 360 dupacks, whether and by how much it is proper to adjust the initial FRT value set 310 just after the START 305 of the flowchart 300.

The flowchart 300 next shows a decision box 375 for the determining 370 asking whether the RTT was less than one for the ACK received by the sender. If the ACK for the retransmitted 350 packet has a RTT less than one, resulting in a yes for the decision box 375, then this result is indicative of a re-ordering problem, and further enabling logic reduced to hardware and/or software estimates and resets 380 the initial FRT value, based on the congestion window and the counted 360 dupacks, as previously discussed. However, if the answer to the decision box 375 is no, meaning that the ACK for the packet is at or larger than one round trip time, then this result is indicative of a data loss problem, and re-transmission 350 may solve the packet loss problem and adjusting the FRT value is unnecessary. After a no to the decision block 375 or estimating and re-setting 380 the FRT value based on the congestion window, then the flowchart 300 ENDS 385.

Figure 4:
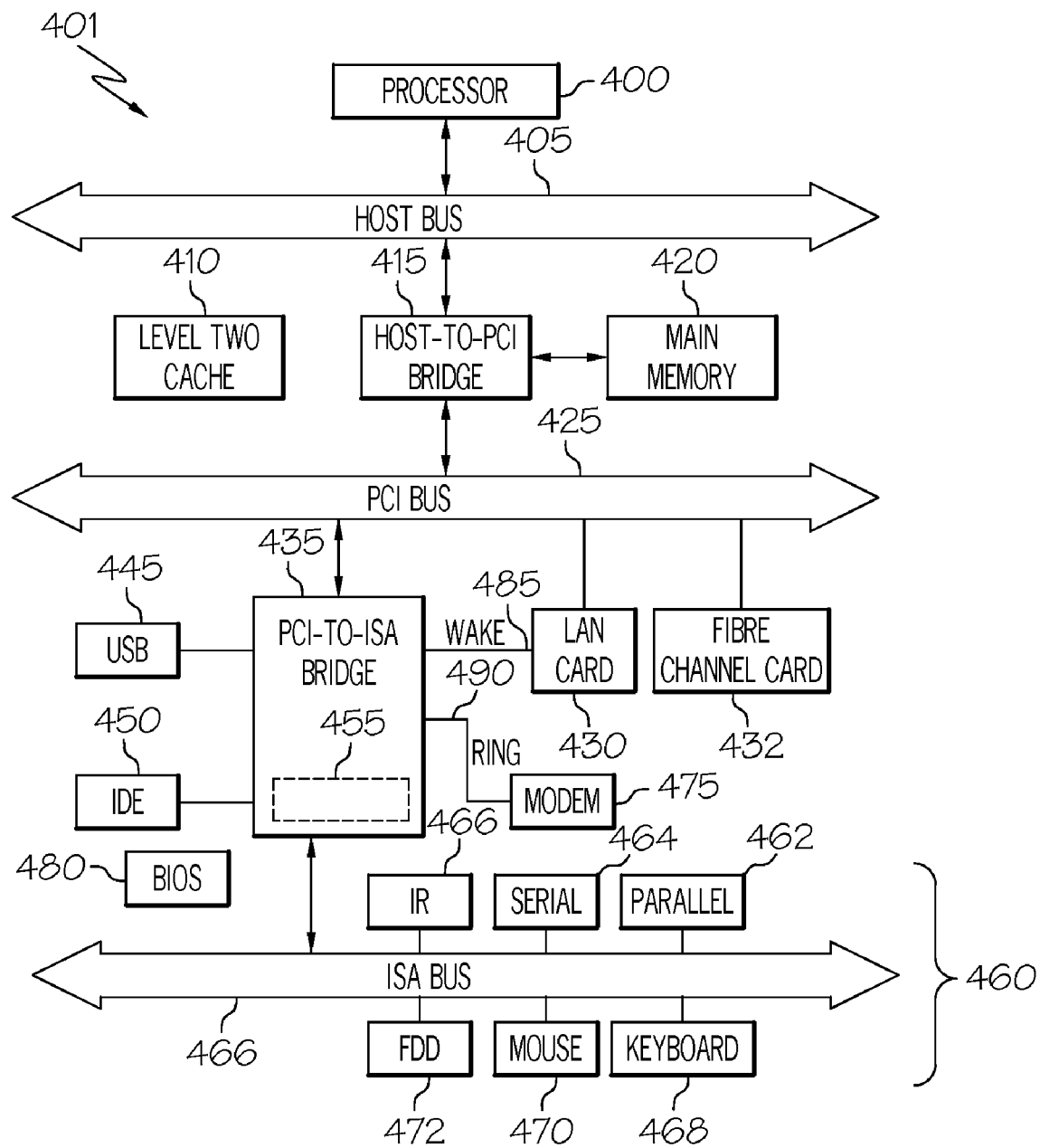
FIG. 4 depicts a computer system capable of being a receiver or sender that is part of a computer system coupled in the networked computer system as discussed in this disclosure if coupled to a non-depicted network, such as an internet as shown in FIG. 1, for use in adjusting a fast re-transmit threshold value for transmitting streams of data over the networked computer system.

FIG. 4 illustrates information handling system 401 which is a simplified example of a computer system, such as sender 110 or receiver 135 in FIG. 1, in communication with or having integrally contained therein networked system for exchanging and allowing the processing of communications and packets via a protocol, and capable of performing the operations described herein. Computer system 401 includes processor 400 which is coupled to host bus 405. A level two (L2) cache memory 410 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. PCI bus 425 provides an interface for a variety of devices including, for example, LAN card 430. PCI-to-ISA bridge 435 provides bus control to handle transfers between PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, fixed disk (HDD) 472, removable storage device 474) coupled to ISA bus 440. Alternatively, many I/O devices can be accommodated by a super I/O controller (not shown) attached to ISA bus 440.

BIOS 480 is coupled to ISA bus 440, and incorporates the necessary processor executable code for a variety of low-level system functions and system boot functions. BIOS 480 can be stored in any computer-readable storage medium, including magnetic storage media, optical storage media, flash memory, random access memory, read only memory, and so forth. In order to attach computer system 401 to another computer system to copy files over a network, LAN card 430 is coupled to PCI bus 425 and to PCI-to-ISA bridge 435. Similarly, to couple computer system 401 to an ISP to couple to the Internet using a telephone line connection, modem 475 is connected to serial port 464 and PCI-to-ISA Bridge 435.

While the computer system described in FIG. 4 is capable of executing the present disclosure described herein, this computer system is simply one example of a computer system. Those skilled in the art will appreciate that many other computer system designs are capable of performing the present disclosure described herein, and this is exemplified for the case of transport layer load balancing where a couple to many, many receiving computer systems, i.e., receivers, having different transmission rates of their respective dupacks and ACKs sent over the network to the sending computer system, i.e., sender.

Another embodiment of the present disclosure is implemented as a program product for use within a device such as, for example, system 100 as shown in FIG. 1. The program(s) of the program product defines functions of the embodiments (including the methods described herein) and can be contained on a variety of data-bearing media. Illustrative data-bearing media include, but are not limited to: (i) information permanently stored on non-writable storage-type accessible media (e.g., read-only memory devices within a computer such as CD-ROM disks readable by a CD-ROM drive); (ii) alterable information stored on writable storage-type accessible media (e.g., floppy disks within a diskette drive or hard-disk drive); and (iii) information conveyed to a computer by a communications medium, such as through a computer or telephone network, including wireless communications. The latter embodiment specifically includes information downloaded onto either permanent or even sheer momentary storage-type accessible media from the World Wide Web, an internet, and/or other networks, such as those known, discussed and/or explicitly referred to herein. Such data-bearing media, when carrying computer-readable instructions that direct the functions of the present disclosure, represent embodiments of the present disclosure.

In general, the routines executed to implement the embodiments of the present disclosure, may be part of an operating system or a specific application, component, program, module, object, or sequence of instructions. The computer program of the present disclosure typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the present disclosure. However, it should be appreciated that any particular program nomenclature that follows is used merely for convenience, and thus the present disclosure should not be limited to use solely in any specific application identified and/or implied by such nomenclature.

An FRT having a hard-coded 3, as above-shown, is not always proper and, instead, should adapt to network conditions in order to not waste precious time and resources required for re-ordering of packets. Accordingly, the FRT value may be adapted to actual network conditions relative to the size of the congestion window, such as knowing when to increase and decrease the FRT value, but all the while the conservation of packets is preserved in line with TCP principles. If the sender receives an ACK for the packet in less than one round trip time, then this is indicative of a re-ordering problem, and re-setting the FRT value may then be desirable to adapt to actual network conditions.

While the foregoing is directed to example embodiments of the present disclosure, other and further embodiments of the present disclosure may be devised without departing from the basic scope thereof, and the scope thereof is determined by the claims that follow.

What is claimed is:

1. A method for adjusting a fast re-transmit threshold value for transmitting streams of data over a computer system, the method comprising:
   receiving, by a sender, a current fast re-transmit threshold value of duplicate acknowledgements (dupacks) for a packet from a receiver, wherein the fast re-transmit threshold value indicates a number of dupacks that, if received, causes a fast re-transmit operation to be performed;
   decreasing, based on the receiving, a size of a congestion window of the sender;
   re-transmitting, by the sender and subsequent to the decreasing, the packet to the receiver, wherein the receiver is in network communication with the sender on the computer system having at least one processor coupled to memory;
   counting, by the sender, a number of dupacks after the re-transmitting until arrival, at the sender, of an acknowledgement (ACK) for the packet;
   determining whether to adjust the current fast re-transmit threshold value to be a new fast re-transmit threshold value different from the current re-transmit threshold value; and
   setting, based on the size of the congestion window and the counting, a value of the current fast re-transmit threshold value to the new fast re-transmit threshold value in response to a determination to adjust the current fast re-transmit threshold value.

2. The method of claim 1, further comprising setting the current fast re-transmit threshold value to three dupacks.

3. The method of claim 1, further comprising recording an initial size of the congestion window before the decreasing.

4. The method of claim 1, further comprising recording a round trip time for the packet on the computer system.

5. The method of claim 1, wherein the setting further comprises re-setting the current fast re-transmit threshold value to an initial value if the sender receives the ACK for the packet in less than one round trip time, a result indicative of a re-ordering problem.

6. The method of claim 1, wherein the setting further comprises retaining the current fast re-transmit threshold value if the sender receives the ACK for the packet between at and larger than one round trip time, a result indicative of a data loss problem.

7. The method of claim 1, wherein the setting further comprises estimating, based on the size of the congestion window and the counting, the value of the fast re-transmit threshold value.

8. The method of claim 1, wherein the setting further comprising automatically changing the value of the fast re-transmit threshold value upon changing the size of the congestion window.

9. A computer program product for adjusting a fast re-transmit threshold value for transmitting streams of data over a computer system, comprising:
   a computer readable storage device;
   first program instructions to receive, by a sender, a current fast re-transmit threshold value of duplicate acknowledgements (dupacks) for a packet from a receiver, wherein the fast re-transmit threshold value indicates a number of dupacks that, if received, causes a fast re-transmit operation to be performed;

second program instructions to decrease, based on and subsequent to performance of the first program instructions to receive, a size of a congestion window of the sender;

third program instructions to re-transmit, by the sender and subsequent to the decreasing, the packet to the receiver, wherein the receiver is in network communication with the sender on the computer system;

fourth program instructions to count, by the sender, a number of dupacks after performance of the third program instructions to re-transmit until arrival, at the sender, of an acknowledgement (ACK) for the packet;

fifth program instructions to determine whether to adjust the current fast re-transmit threshold value to be a new fast re-transmit threshold value different from the current re-transmit threshold value;

fifth sixth program instructions to set, based on the size of the congestion window and the fourth program instructions to count, a value of the current fast re-transmit threshold value to the new fast re-transmit threshold value in response to a determination to adjust the current fast re-transmit threshold value; and wherein the first, second, third, fourth, and fifth program instructions are stored on the computer readable storage device.

10. The computer program product of claim 9, further comprising sixth seventh program instructions to set the current value of the fast re-transmit threshold value to three dupacks; and wherein the seventh program instructions are stored on the computer readable storage device.

11. The computer program product of claim 9, further comprising sixth seventh program instructions to record an initial size of the congestion window before performing the second program instructions to decrease; and wherein the seventh program instructions are stored on the computer readable storage device.

12. The computer program product of claim 9, further comprising seventh program instructions to record a round trip time for the packet on the computer system; and wherein the seventh program instructions are stored on the computer readable storage device.

13. The computer program product claim 9, wherein the sixth program instructions to set the value of the current fast re-transmit threshold value further comprises instructions to re-set the current fast re-transmit threshold value to an initial value if the sender receives the ACK for the packet in less than one round trip time, a result indicative of a re-ordering problem.

14. The computer program product of claim 9, wherein the fifth sixth program instructions to set the value of the current fast re-transmit threshold value further comprises instructions to estimate, based on the size of the congestion window and performance of the fourth program instructions to count, the value of the fast transmit threshold value.

15. A system for adjusting a fast re-transmit threshold value for transmitting streams of data over a computer system, the system comprising:

a processor, a computer readable memory and a computer readable storage device;

first program instructions to receive, by a sender, a current fast re-transmit threshold value of duplicate acknowledgements (dupacks) for a packet from a receiver, wherein the fast re-transmit threshold value indicates a number of dupacks that, if received, causes a fast re-transmit operation to be performed;

second program instructions to decrease, based on and subsequent to performing the first program instructions to receive, a size of a congestion window of the sender;

third program instructions to re-transmit, by the sender and subsequent to the decreasing, the packet to the receiver, wherein the receiver is in network communication with the sender on the computer system;

fourth program instructions to count, by the sender, a number of dupacks after performing the third program instructions to re-transmit until arrival, at the sender, of an acknowledgement (ACK) for the packet;

fifth program instructions to determine whether to adjust the current fast re-transmit threshold value to be a new fast re-transmit threshold value different from the current re-transmit threshold value;

sixth program instructions to set, based on the size of the congestion window and the fourth program instructions to count, a value of the current fast re-transmit threshold value to the new fast re-transmit threshold value in response to a determination to adjust the current fast re-transmit threshold value; and wherein the first, second, third, fourth, and fifth program instructions are stored on the computer readable storage device for execution by the processor via the computer readable memory.

16. The system of claim 15, further comprising sixth seventh program instructions to set the current fast re-transmit threshold value to three dupacks; wherein the seventh program instructions are stored on the computer readable storage device for execution by the processor via the computer readable memory.

17. The system of claim 15, further comprising seventh program instructions to record an initial size of the congestion window before performance of the second program instructions to decrease and a round trip time for the packet on the computer system; wherein the sixth seventh program instructions are stored on the computer readable storage device for execution by the processor via the computer readable memory.

18. The system of claim 15, wherein the fifth sixth program instructions to set the value of the current fast re-transmit threshold value further comprises instructions to re-set the current fast re-transmit threshold value to an initial value if the sender receives the ACK for the packet in less than one round trip time, a result indicative of the re-ordering problem.

19. The system of claim 15, wherein the fifth sixth program instructions to determine set the value of the current fast re-transmit threshold value further comprises instructions to retain the current fast re-transmit threshold value if the sender receives the ACK for the packet between at and larger than one round trip time, a result indicative of a data loss problem.

20. The system of claim 15, wherein the fifth sixth program instructions to set the value of the current fast re-transmit threshold value further comprises instructions to estimate, based on the size of the congestion window and performance of the fourth program instructions to count, the value of the fast re-transmit threshold value.

* * * * *